US010146629B1

(12) United States Patent
Yadav et al.

(10) Patent No.: US 10,146,629 B1
(45) Date of Patent: Dec. 4, 2018

(54) EXTENSIBLE WORKFLOW MANAGER FOR BACKING UP AND RECOVERING MICROSOFT SHADOW COPY COMPATIBLE APPLICATIONS

(71) Applicant: EMC IP Holding Company LLC, Hopkinton, MA (US)

(72) Inventors: Sunil Yadav, Bangalore (IN); Suman Tokuri, Bangalore (IN); Matthew Buchman, Seattle, WA (US); Vladimir Mandic, San Jose, CA (US); Anappa Pradeep, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 276 days.

(21) Appl. No.: 14/673,382

(22) Filed: Mar. 30, 2015

(51) Int. Cl.
*G06F 12/00* (2006.01)
*G06F 11/14* (2006.01)

(52) U.S. Cl.
CPC ...... *G06F 11/1451* (2013.01); *G06F 11/1433* (2013.01); *G06F 11/1464* (2013.01); *G06F 11/1469* (2013.01); *G06F 2201/84* (2013.01)

(58) Field of Classification Search
CPC ............ G06F 11/1451; G06F 11/1433; G06F 11/1464; G06F 11/1469; G06F 2201/84
USPC ....................................................... 711/162
See application file for complete search history.

(56) References Cited

U.S. PATENT DOCUMENTS

| 7,334,095 | B1 * | 2/2008 | Fair ...................... G06F 3/0607 711/161 |
| 7,882,073 | B1 * | 2/2011 | Ojalvo ................ G06F 11/1458 707/640 |
| 8,260,744 | B1 * | 9/2012 | Chatterjee ........... G06F 11/1451 707/639 |
| 8,676,759 | B1 * | 3/2014 | Zhu ..................... G06F 11/1451 707/638 |
| 2005/0246397 | A1 * | 11/2005 | Edwards .......... G06F 17/30067 |
| 2005/0246503 | A1 * | 11/2005 | Fair .................. G06F 17/30067 711/147 |
| 2006/0179261 | A1 * | 8/2006 | Rajan ................ G06F 17/30067 711/162 |
| 2006/0190722 | A1 * | 8/2006 | Sharma .............. G06F 21/6209 713/165 |
| 2008/0209132 | A1 * | 8/2008 | Chen .................. G06F 11/1435 711/141 |
| 2008/0222373 | A1 * | 9/2008 | Garimella .......... G06F 11/1435 711/161 |
| 2011/0296412 | A1 * | 12/2011 | Banga .................. G06F 9/5027 718/1 |

(Continued)

*Primary Examiner* — Prasith Thammavong
(74) *Attorney, Agent, or Firm* — Staniford Tomita LLP

(57) ABSTRACT

A backup and recovery architecture for applications compatible with the Microsoft Windows Volume Shadow Copy Service (VSS) includes a backup client module that includes an orchestration engine, an application manager, a common requestor, and a save transports component. The client module interacts with the VSS on the client in the generation of a shadow copy. Data is backed up from the shadow copy to a backup storage server. In various specific embodiments, the application manager includes functions that are application-specific and the orchestration engine includes functions that are not application-specific. A single consolidated log may be generated by the backup client module for a backup or recover operation.

17 Claims, 10 Drawing Sheets

(56) References Cited

U.S. PATENT DOCUMENTS

| | | | | |
|---|---|---|---|---|
| 2012/0221525 A1* | 8/2012 | Gold | ................... | G06F 11/1458 707/644 |
| 2012/0290537 A1* | 11/2012 | Smith | ................... | G06F 3/0608 707/654 |
| 2013/0138620 A1* | 5/2013 | Yakushev | ......... | G06F 17/30159 707/698 |
| 2013/0191924 A1* | 7/2013 | Tedesco | ................. | G06F 21/00 726/26 |

* cited by examiner

US 10,146,629 B1

EXTENSIBLE WORKFLOW MANAGER FOR BACKING UP AND RECOVERING MICROSOFT SHADOW COPY COMPATIBLE APPLICATIONS

TECHNICAL FIELD

The present invention relates generally to the field of backing up computer data, and, more particularly, to systems and techniques of an extensible architecture for backing up and recovering applications that are compatible with the Microsoft Windows® Volume Shadow Copy Service (VSS)™.

BACKGROUND

In today's digital society organizations depend on having ready access to their data. Data, however, can be lost in a variety of ways such as though disasters and catastrophes (e.g., fires or flooding), media failures (e.g., disk crash), computer viruses, accidental deletion, and so forth. Thus, it is important that the data be backed up. An organization may have an immense amount of data that is critical to the organization's operation. In many cases, it may not be feasible for a computer system to be offline for an extended amount of time. Thus, it is desirable that a backup application be able to quickly and efficiently backup and recover a computer system.

Due in part, however, to the complexity of the data to be backed up, the amount of data to be backed up, and the constant demand for new backup and recovery features, backup products can require a large amount of time to perform backup and recovery operations. Complex software architectures can lead to problems with customer installation, troubleshooting, and product updates.

Therefore, there is a need for improved systems and techniques for a backup and recovery product that can quickly and efficiently perform backup and recovery operations of data and applications, and that is easy to maintain.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
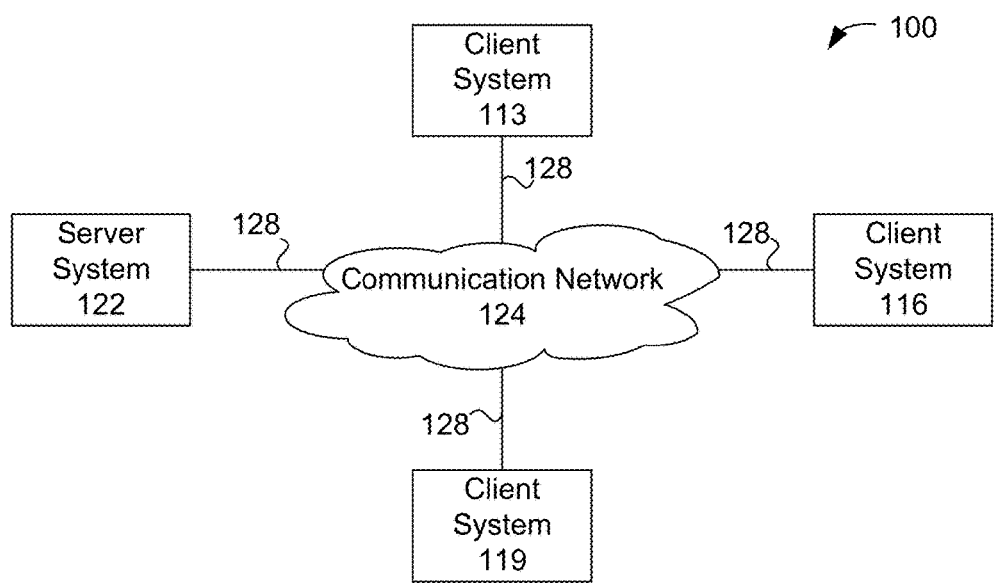
FIG. 1 shows a block diagram of a client-server system and network in which an embodiment of the system may be implemented.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 is a simplified block diagram of a distributed computer network 100 in which an embodiment of the system may be implemented. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft Corporation, Google Chrome® provided by Google, Safari® provided by Apple Inc., and the Firefox® browser provided by Mozilla Foundation, and others.

In an embodiment, a user interfaces with the system through a computer workstation system. The computer system may include a monitor, screen, cabinet, keyboard, and mouse. The cabinet houses familiar computer components such as a processor, memory, mass storage devices, input/output (I/O) controller, display adapter, serial or universal serial bus (USB) port, network interface, speaker, and the like.

Mass storage devices may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on a mass storage device. The source code of the software may also be stored or reside on a mass storage device (e.g., hard disk, magnetic disk, tape, or CD-ROM). As a further example, code may be transmitted via wires, radio waves, or through a network such as the Internet.

Computer software products may be written in any of various suitable programming languages, such as C, C++, C#, Pascal, Fortran, Perl®, Matlab® (from MathWorks), SAS, SPSS, JavaScript®, AJAX, Java®, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as JavaBeans® (from Oracle Corporation) or Enterprise JavaBeans® (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems that support Microsoft Windows Shadow Copy™ (also referred to as Volume Snapshot Service™, Volume Shadow Copy Service™, or VSS™). An operating system may be one of Windows XP®, Windows Server 2003, Windows Vista®, Windows 7, Windows Server 2008, Windows Server 2008 R2, Windows 8, Windows Server 2012, and Windows Server 2012 R2, among others. A file system of the system may be NTFS (New Technology File System) or ReFS (Resilient File System) as developed by Microsoft. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 2:
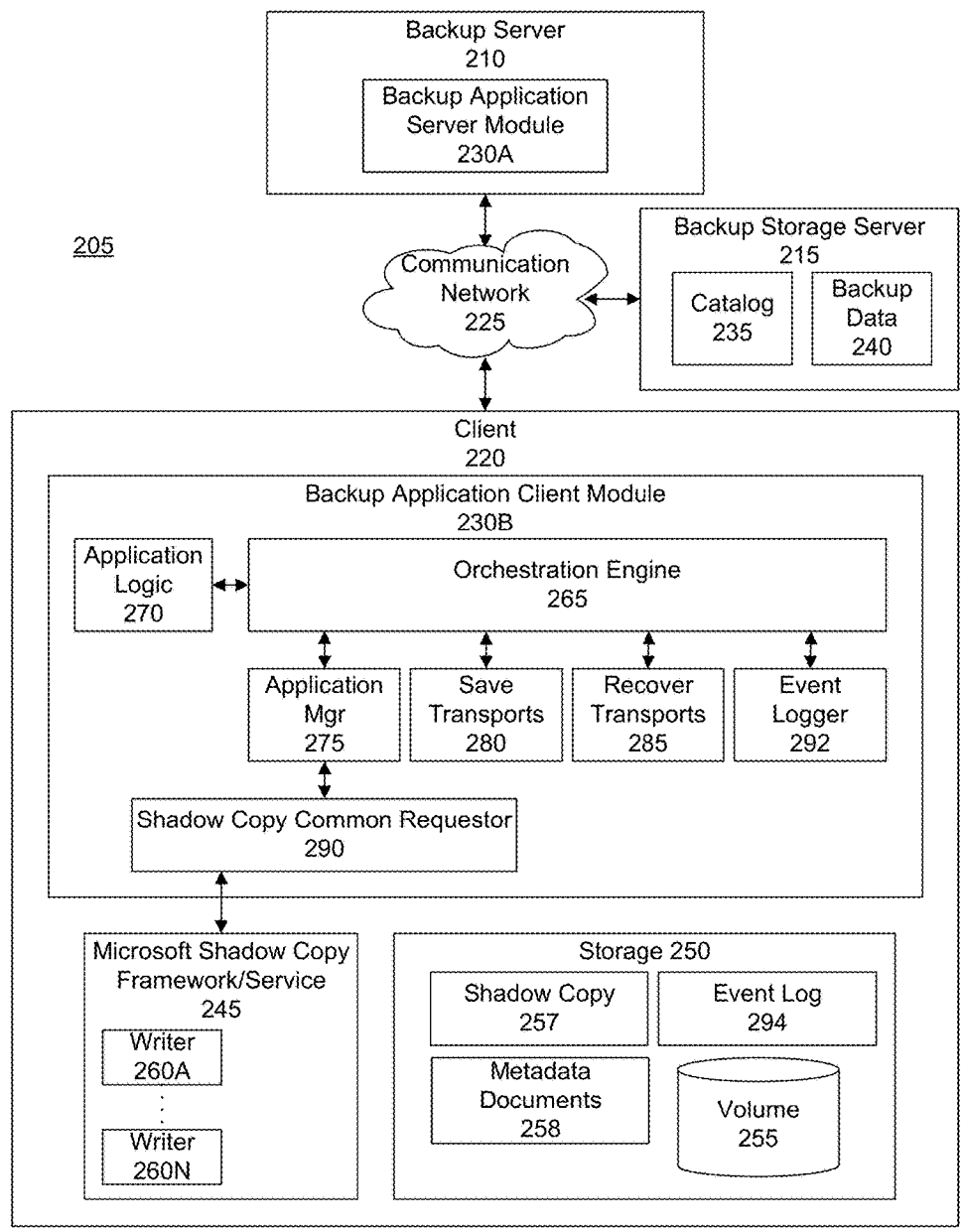
FIG. 2 shows an overall architecture of a system for backup and recovery.

FIG. 2 shows a system 205 having an efficient or simplified architecture for the backup and recovery of data including applications. The applications provide, support, or are compatible with a Microsoft volume snapshot service framework. Some specific examples of applications that support the Microsoft volume snapshot service framework include Exchange®, SharePoint®, Hyper-V®, and SQL Server® as provided by Microsoft Corporation of Redmond, Wash. Microsoft refers to its volume snapshot service as a Volume Shadow Copy Service (VSS)™. Shadow copy services such as VSS™ facilitate the backup and recovery of system states, applications, services, and data through point-in-time copies of volumes. These point-in-time copies may be referred to as a snapshot, shadow copy, or virtual volume.

As shown in the example of FIG. 2, in a specific embodiment, the system includes a backup server 210, a backup storage server 215, and one or more clients 220, each of which are connected via a communication network 225. The communication network may be as shown in FIG. 1 and described above. The servers, client, or both can be general purpose computers having hardware and software as described above in the discussion accompanying FIG. 1. Although FIG. 2 shows a single client, it should be appreciated that there can be any number of clients. For example, there may be tens, hundreds, or even thousands of clients to be backed up. Similarly, there can be multiple backup storage servers or nodes to help increase performance, provide redundancy, or both.

In a specific embodiment, there is a backup application that includes a backup application server module 230A and a backup application client module 230B. The backup application client and server modules communicate with each other to backup data on the client to the backup storage server or protection storage managed by the backup storage server. The backup storage server and protection storage may include disk, tape, a deduplication storage system (e.g., EMC Data Domain®), or combinations of these. The backup storage server includes a catalog 235 and data backed up 240 from the client. In some embodiments, the backup storage server includes a catalog 235 and the protection storage includes data backed up from the client. The storage may be local to the server or may be external such as in the form of a deduplication appliance, or other storage configuration. The backed up data may include a volume, portion of a volume, applications, services, user-generated or user data, logs, files, directories, databases, operating system information, configuration files, machine data, system data, and so forth.

The catalog provides an index of the data stored on the backup storage server or protection storage managed by the backup storage server. The catalog may include metadata associated with the backup such as an identification of the files stored on the backup storage server (e.g., globally unique identifier (GUID) of a backed up database), the time and date of backup, size of the backup, an identification of the backup source (e.g., if the backup included an application cluster then the identification of the source node associated with the application cluster), a manifest (e.g., a file manifest for a backed up database may include a location of the database, and a location of the backed up log files), the VSS metadata captured during the backup, file aliases and original file paths, a flag indicating the data was backed up from a shadow copy volume, type of backup performed (e.g., volume block-based backup (BBB) versus traditional save—a traditional save typically includes opening a file, reading the file, and closing the file; a volume block-based backup reads a disk volume space as blocks and generally does not require opening and closing files which can then allow for a faster backup), information required for restoring or recovering the backup, and so forth. The catalog can track and index various shadow copy snapshots and provide for the recovery of individual items.

The client includes backup application client module 230B, a Microsoft Windows Volume Shadow Copy Service (VSS)™ framework 245 running on the client, and client storage 250. The VSS™ facilitates the creation of a snapshot of data such as a volume or volume of files 255. Once a shadow copy 257 has been created, the backup application client module can copy data from the shadow copy to the backup storage along with any metadata documents 258 associated with the shadow copy and thus create a backup of the volume. The metadata documents may include information necessary to a backup or restore operation. Once the backup has been created, the shadow copy may be deleted from the client storage. The terms shadow copy and volume snapshot may be used interchangeably.

The Microsoft Shadow Copy Service™ helps to provide a consistent image of a dataset such as a file system and application so that it can be backed up by the backup application. The shadow copy service helps to ensure a logically consistent backup. For example, in many cases it would be desirable to perform a backup while the client computer is in use (e.g., when there may be open files that are being written to) in order to reduce or minimize the amount of downtime. Modifying data while a backup is running, however, can result in a corrupt backup.

The Microsoft Shadow Copy Service™ includes components including writers 260A . . . N to help ensure logically-consistent open file backups. There may be a writer for each application to be backed up. For example, there may be an Exchange Writer, SQL Server Writer, Hyper-V Writer, and so forth. A writer is responsible for functions such as quiescing the corresponding application and data stores to be backed up (e.g., temporarily freezing application I/O write requests) and flushing the cache for shadow copy generation, and thawing the application and data stores after the shadow copy is generated. A writer may further create or facilitate the creation of a description of the backup components, a data restoration process, or both. The information can be used by the backup application to determine how to backup and restore or recover the data.

In a specific embodiment, the backup application client module includes several components or layers including an orchestration engine or logic 265, an application logic 270, an application manager 275, a save transports 280, a recover transports 285, a shadow copy common requestor 290, and an event logger 292. In a specific embodiment, the backup application client module is designed for software-based snapshots. In another specific embodiment, the backup application client module can support hardware-based snapshots.

The orchestration engine, which may be referred to as a controller, is responsible for interactions among components such as the application manager, common requestor, and transport components. The orchestration engine is responsible for interactions among layers such as the application manager layer, shadow copy service layer, and transport layers. This component acts as a controller and may include the application manager and a transport manager. The orchestration engine component is application agnostic.

The save transports component includes a library that manages tasks related to application data movement. Each transport type is discussed later below.

The common requestor component is responsible for all shadow copy related operations such as application and/or volume selection, shadow copy creation, deletion, mounting, and so forth. The requestor may include a library that runs the shadow copy service APIs. The common requestor is a component that calls the Microsoft provided API for backup applications to integrate with the VSS framework.

The application manager layer interacts with the applications to be backed up through common interfaces. The application manager component gathers application specific information as required for backup operations, restore operations, or both. Methods to get\set information from applications differ, but this component provides common interfaces to the orchestration engine or controller. The application manager is also responsible for communicating with the common requestor for various tasks as needed during a backup or restore operation such as discovering and selecting the databases that are available for backup through the shadow copy service.

There is one application manager instance per application type and that application manager instance contains the business logic specific to that application. For example, there is one application manager for Exchange®, another different application manager for SQL Server®, another different application manager for SharePoint®, another different application manager for Hyper-V, and so forth. This modular approach helps to facilitate ongoing development of the backup application. For example, when there becomes a need to backup (and recover) a new application compatible with VSS™, a new application manager for that new application can be added to the system with relatively few or no changes. For example, since orchestration engine is application agnostic, the orchestration engine thereby provides a set of general, common, or basic functions applicable to any application to be backed up. The new application can be backed up without having to make any or any extensive changes to the orchestration engine. In a specific embodiment, the application manager is extendable for different backup methods. For example, the discussion of the transport manager below includes a discussion of various backup methods, each of which can be supported by the application manager or different embodiments of the application manager.

The transport manager (also referred to as save transports and recover transports) manages tasks related to application data movement to and from backup storage. This layer decides the data-movement methods such as, but not limited to, volume block-based backup, or traditional save. The transport manager can provide for application-specific transport mechanisms (e.g., file-based backups or stream-based backups). For example, some applications such as SQL Server Virtual Device Interface (VDI), support stream-based backup. In other words, when a backup application wants to back up a particular database, the Microsoft® application streams the data to the backup application as buffers, not as files. Then the backup application can save the data to the storage server. The transport engine can be re-used and extended to such applications. As another example, the transport manager can be used for Blocked-based Backup where the data movement and save mechanism is different. Any new backup methods, may implement some method-specific details and other interfaces may remain the same as the architecture is based on Object Oriented Analysis and Design principles. The system can support a hybrid data protection approach where, for example, both VSS™ and VDI are used in conjunction.

The event logger is responsible for logging events based on calls from the various components of the backup client module. For example, the shadow copy common requestor may call the event logger to write an entry to an event log 294. Similarly, the save transports may call the event logger to write another entry to the event log. Thus, each component of the backup client module may call the same event logger. Records for each event associated with different components of the backup application client module may be stored in the same event log file. An administrator can use the log to help determine how and why an error occurred, identify what conditions caused the error, and identify the context in which the error occurred. By periodically reviewing the log, the administrator may be able to identify problems (e.g., failing hard disk, insufficient memory, insufficient storage, configuration conflicts, or improper settings) before they cause serious damage.

A feature of the architecture shown in FIG. 2 includes an efficient design for the layers of software components and products for backup and recovery of shadow copy compatible applications. The architecture is reusable and extensible to other backup mechanisms. Consider, as an example, a SQL VDI backup or a mixed solution for SQL Server®, where some features are supported by VSS™ and some by VDI (e.g., incremental backup as VSS™ does not support incremental backup). In the simplified framework shown in FIG. 2, an application manager for SQL VDI can be added without changes or without extensive changes in the other parts of the framework. The orchestration logic or engine controls both the VSS™ and VDI workflows. A benefit of the architecture shown in FIG. 2 includes a single product and single implementation. A single product and implementation helps to lower costs such as maintenance and support costs. As another example, hardware provider workflows can be easily added to the system. Further, the system can be used for server-less or agent based backup products. Each application may use the simplified approach discussed herein for backup and restore.

Problems with other architectures include many different layers and products. For example, there may be one product for the client base, another product for application consistency snapshots, and yet another product for data movement and snapshot life cycle management. Each product may have its own software design, object model, process model, code base, event model, and logging model. Different models make it difficult to release updates and new versions, diagnose bugs, and install and configure.

For example, a system that includes different logging models can lead to problems in serviceability and support. It can be very frustrating and burdensome to review multiple logs because each log may have formats, parameters, elements, recorded event types, event descriptions, fields, identifiers, header information, structures, and recording guidelines that differ from another log. A system that includes many different products is also burdensome for the customer because the customer may have to install and configure multiple products and components which can lead to problems with registering services and other conflicts.

Further, multiple layers can result in slower backup and restore operations, complex and time consuming maintenance of different layers, restrictions on workflows when new features are to be added, slow shadow copy creation, slow data rollover because multiple binaries are involved, lack of control over optimization in different layers, a complex architecture that prevents faster adoption of new technologies and requires more time to implement new functional requirements, complex troubleshooting and lack of end-to-end error recovery, multiple logging mechanisms and logs as each layer maintains its own log (thus making log consolidation very difficult and time-consuming), and much more. For example, crossing a component boundary to access a service can lead to performance bottlenecks—especially when those services are running on different hosts. Architectures designed for hardware-based snapshots (e.g., snapshots created by firmware embedded in the hardware) are not readily adaptable for software-based snapshots.

As discussed above, the system shown in the example of FIG. 2 provides a simplified architecture developed to solve the problems and limitations with existing backup product architectures. The architecture is object oriented and uses C++ as a programming language. Some advantages and benefits of the architecture shown in FIG. 2 include reduced product complexity, pluggable application manager for applications that integrate with Microsoft VSS™, pluggable data movement transports logics for traditional save and block-based save, a logic that creates a managed snapshot media database representation for persistent snapshot to support different types of workflows, a reduction of product logging to a single log, componentized application logic such that it is agnostic, and reusable application agents that can be easily re-used with other products, and enablement of enterprise features such as block-based backup, and synthetic full backups (a type of backup that combines a full backup with all subsequent incremental backups in a new full backup, i.e., a synthetic full backup).

Persistent snapshots refer to snapshots that are not saved to media but their information needs to be saved for later reusage of the snapshots. The actual snapshot still resides on the host (or storage appliance, e.g., storage area network (SAN)-based storage appliance) and using media information, operations such as rollover, revert, and so forth are performed on the snapshot. The actual data of the snapshot is not transferred to the backup storage sever. An entry is made in the backup catalog without having copied the actual data of the snapshot over to the backup storage server. Persistent snapshots can allow for more frequent snapshots during the day without having to tax computing resources (e.g., network bandwidth) since the actual snapshot data is not being copied or moved to the backup media. Restores to the production storage can be from the snapshot rather than from the backup media. Specific embodiments of the transport manager support persistent snapshots.

The overall system provides application agents that can be easily re-used as stand-alone backup agents or agents that interface with different backup services by swapping out components such as the transport layer. In a specific embodiment, services participating in the backup operation, recover operation, or both run on a single host. This helps to reduce performance bottlenecks.

In a specific embodiment, the orchestration engine is application agnostic. That is, the orchestration engine includes functions that are not application-specific. This allows the orchestration engine to be used in other backup products with few or no changes. The application manager, however, may include functions that are application-specific. For example, in a specific embodiment, the application manager includes functions that are specific for backing up and recovering applications from Microsoft®. In this specific embodiment, the application manager may include functions, protocols, services, an application programming interface (API), parameters, and so forth that are specific to Microsoft applications (e.g., Microsoft Exchange®) or a Microsoft schema. If there are other non-Microsoft applications to be backed up and recovered that support shadow copy capability, a new application manager may be added without having to make changes or extensive changes to the orchestration engine.

In a specific embodiment, components of the orchestration engine are implemented as libraries stored on the client rather than as services that may be running on separate servers or hosts and that are called using a communication protocol (e.g., HTTP). For example, the save transports component may be implemented as a library using an object-oriented design. Data to be backed up may be represented as an object and passed to the save transports component. Similarly, the application manager may also be implemented as a library using an object-oriented design. A library implementation can offer a performance improvement and reduction in complexity for the backing up and recovery of applications.

Figure 3:
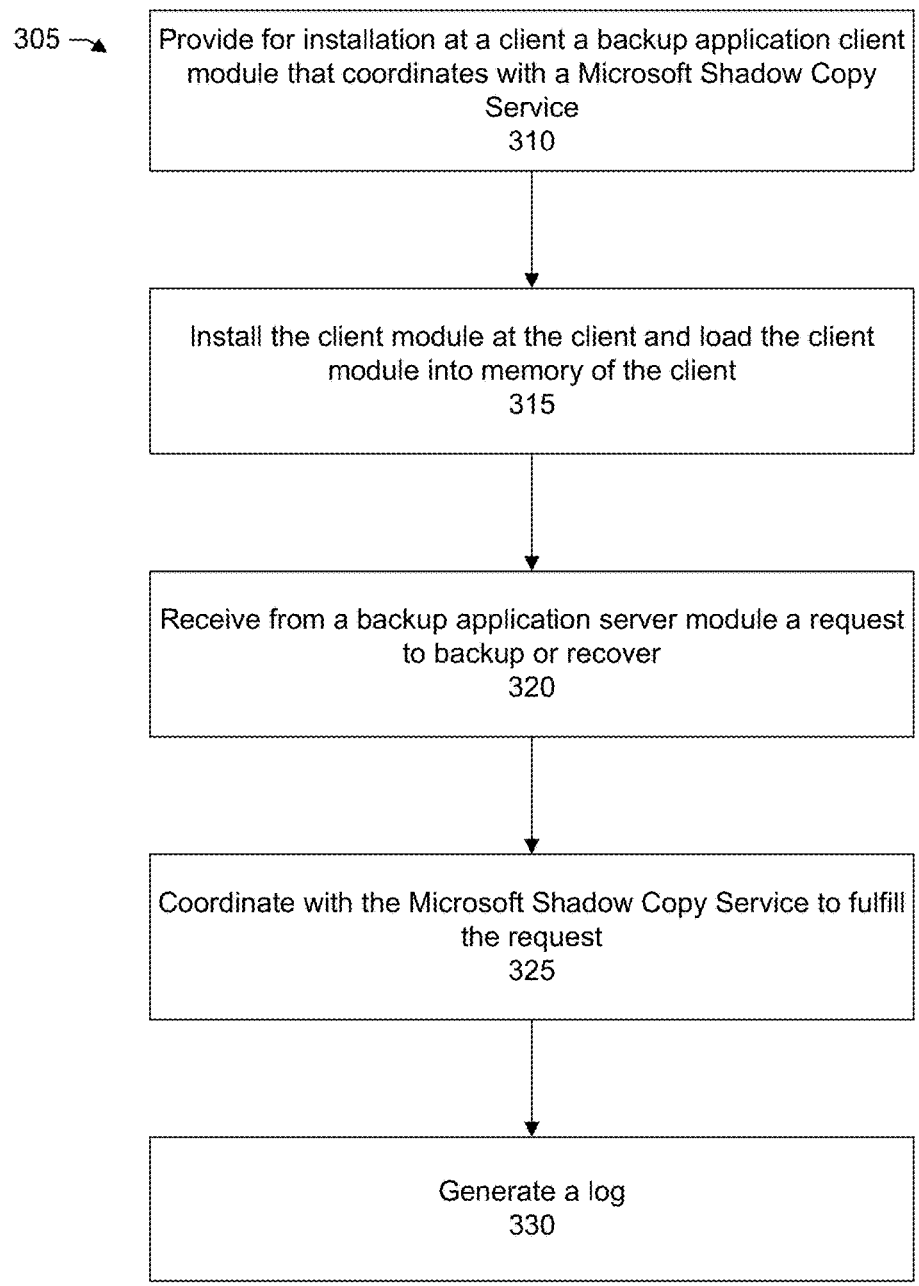
FIG. 3 shows an overall flow diagram of the system.

FIG. 3 shows an overall flow 305 of the system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a backup client application module is provided for installation at a client. The backup client application module coordinates and communicates with the Microsoft shadow copy service to backup and recover the client. In a step 315, the client module is installed at the client and loaded into memory of the client. In a step 320, the client module receives from a backup application server module a request to backup or recover.

In a step 325, the client module coordinates and communicates with the Microsoft shadow copy service and a backup storage server to fulfill the request. For example, in the case of a backup operation, the shadow copy common requestor of the client module may issue a request or notify the Microsoft shadow copy service of the generation of a shadow copy. The Microsoft shadow copy service instructs the VSS-aware applications to quiesce or temporarily freeze data transactions. Freezing data transactions may include halting new transactions, completing in-progress transactions, and flushing any cached data to disk.

A VSS-aware application may further inform the backup application as to the location of the application's data, what files contain the application's data, information about application icons, information about files to include in the backup, information about files to exclude from the backup, information on restoring the data, or combinations of these. In a specific embodiment, the description is stored as metadata in one or more Extensible Markup Language (XML) formatted documents. These metadata documents may include information necessary to a Microsoft VSS backup or restore operation.

Once the application, data store, or dataset have been properly quiesced and the VSS-aware application and its components (e.g., databases) that will participate in the backup have been identified, the orchestration engine instructs the desired VSS snapshot provider to create a shadow copy. The shadow copy is created by the shadow copy framework or service, or some other provider. Once the shadow copy has been created, the backup client application module copies data from the shadow copy to the backup storage server along with any metadata documents that may be associated with the shadow copy. In some cases, there can be multiple shadow copies to be backed up (e.g., two or more shadow copies). For example, a dataset to be backed up (e.g., Exchange®) may exists on two volumes and there can be a shadow copy for each volume.

In a step 330, the client module generates a log. In a specific embodiment, a single log is created. For example, during a backup operation, a single backup log file may be created. Similarly, during a recover operation, a single recover log file may be created. As a result, when trying to diagnose problems, an administrator does not have to check or examine multiple sources. A single log file provides a centralized way for the administrator to examine events related to a backup or recover operation.

In this specific embodiment, each component of the backup application client module may rely on the same event logging service, function, model, or mechanism. For example, during an operation such as a backup operation, both the shadow copy common requestor and save transports components may call the same logging function for the logging of events. Having a component architecture where each component uses the same logging model helps to ensure consistency and standardization regarding log parameters, fields, event types and descriptions, identifiers, log header information, and so forth.

Figure 4:
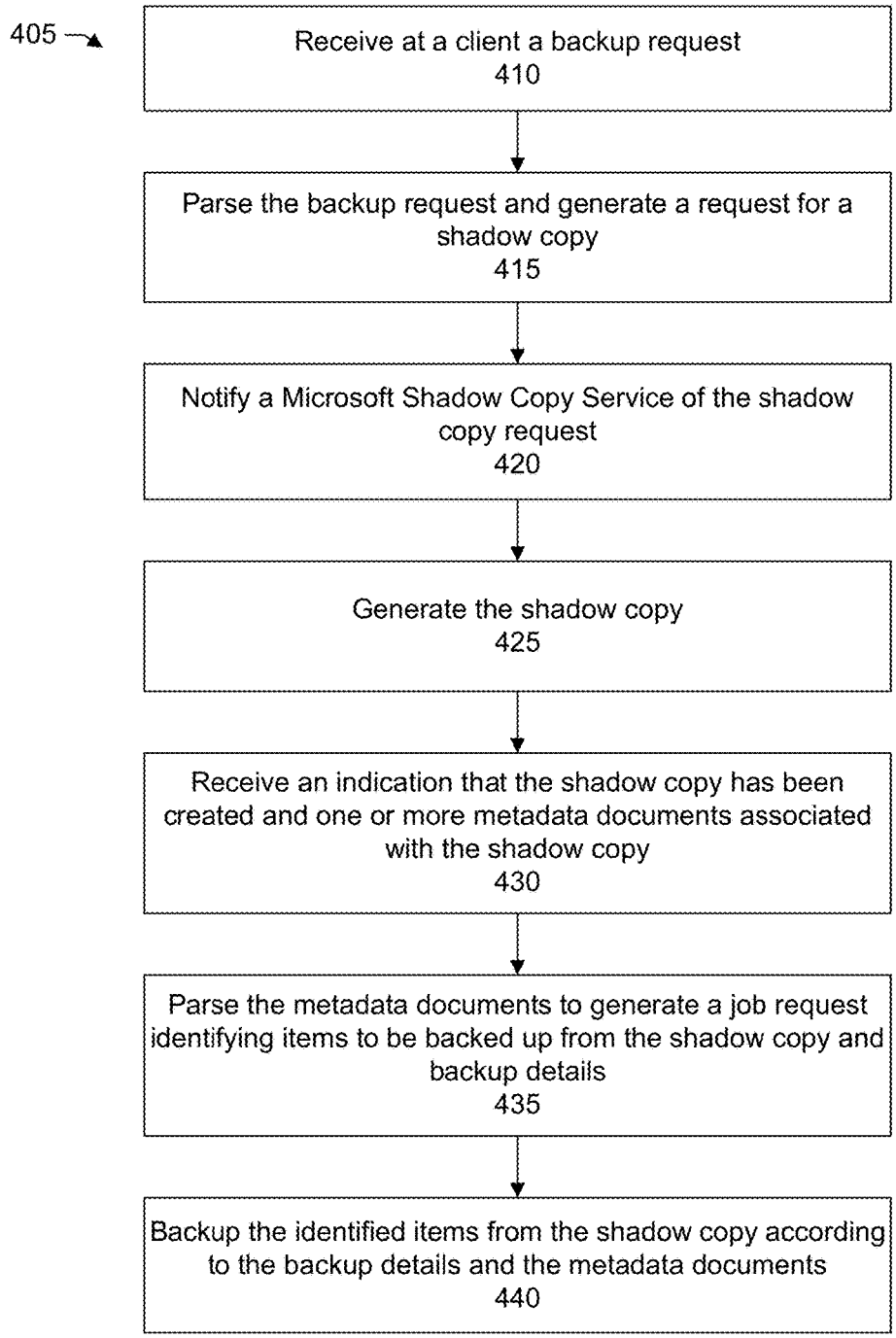
FIG. 4 shows a flow diagram for a backup operation.

FIG. 4 shows an overall flow 405 of a backup operation. In a step 410, the orchestration engine at the client receives a job request from the backup server to backup the client. The orchestration engine performs the high level workflow to fulfill the job request. In a step 415, the orchestration engine parses the request and generates a request for a shadow copy. For example, the job request may be received by the orchestration engine as command line arguments having a set of parameters to be parsed and processed. The job request may specify a particular database or application that the administrator has selected to be backed up. The job request may further include policy settings such as a retention period for the backup, a target location for the backup, other settings, and so forth.

Consider, as an example, a job request to backup an Exchange database. In a specific embodiment, the orchestration engine may communicate with the application manager for Exchange to obtain a list of databases, validate that the database name specified in the job request is a valid Exchange database, confirm that the database is in a state ready for backup, or combinations of these. For example, the database state may have changed since the time the initial job configuration was performed. Instead or additionally, the description in the job request may not explicitly identify the databases to backup. For example, the description may simply be an instruction to "backup all databases." In this case, the orchestration engine communicates with the application manager for Exchange to expand and identify the list of databases to be backed up.

In a step 420, a Microsoft Shadow Copy Service™ is notified of the request to obtain a shadow copy. The request for the shadow copy may be passed from the orchestration engine to the shadow copy common requestor. More particularly, the orchestration engine interfaces with the shadow copy common requestor via an API to perform a discovery of the application, e.g., discovery of the VSS-aware application including a discovery of the application writers. The shadow copy common requestor, in turn, interfaces with the shadow copy service to obtain the list of writers. The orchestration engine, upon receiving the reported writers from the shadow copy service via the shadow copy common requestor, examines the reported writers to locate the desired writer (e.g., the Exchange Writer) corresponding to the database to be backed up.

Once the orchestration engine has performed the discovery and mapping of the items for backup in the job request to the corresponding writer and writer components, the orchestration engine selects and identifies these writers using the shadow copy common requestor. The orchestration engine may instruct the shadow copy common requestor of the components that should participate in the backup. The orchestration engine may instruct the shadow copy common requestor to create the shadow copy, e.g., the volume snapshot for the volumes on which that Exchange database resides.

More particularly, the discovery of the shadow copy writers on the system is facilitated through an API provided by the Microsoft shadow copy service. The interfaces include gatherwritermetadata, getwritermetadatacount, and getwritermetadata(index). The layered architecture of the system is such that the orchestration engine will call the common requestor to perform discovery. The specific VSS API calls are isolated to the common requestor. Specifically, the common requestor in turn then calls the Microsoft VSS APIs such as gatherwritermetadata, getwritermetadatacount, and getwritermetadata(index). The getwritermetadata(index) receives a writer metadata document for a specific writer. The documents flow backup through the common requestor to the orchestration engine. The orchestration engine then asks or queries each application manager if this writer metadata document matches the application that the application manager supports.

In a step 425, the shadow copy is created or generated. In a step 430, the orchestration engine may receive, through the shadow copy common requestor, an indication that the shadow copy has been created. The shadow copy may be associated with one or more metadata documents created by or in conjunction with the shadow copy service.

In a specific embodiment, there is a first metadata document and a second metadata document. The first metadata document may be referred to as a Backup Components Document. The second metadata document may be referred to as a Writer Metadata Document. In this specific embodiment, the metadata is represented in an XML format using a schema as provided by Microsoft®.

The Backup Components Document may include a description of the application and component (e.g., Writer component) that participated in the backup operation, and a description of the shadow copy (e.g., shadow copy volume device names). The shadow copy volume may include a point-in-time copy of, for example, the Exchange database file, and Exchange log files present at the time the application was quiesced and frozen. The Backup Components Document may be an XML document created by a requester (using, for example, the IVssBackupComponents interface as provided by VSS) in the course of setting up a restore or backup operation. The Backup Components Document may include a list of those explicitly included components, from one or more writers, participating in a backup or restore operation.

The Writer Metadata Document is an XML document created by a writer (using, for example, the IVssCreateWriterMetadata interface as provided by VSS) containing information about the writer's state and components. A requester can query Writer Metadata Documents (using, for example, the IVssExamineWriterMetadata interface as provided by VSS) when performing a restore or backup operation. A Writer Metadata Document may include a list of all of a writer's components, any one of which might participate in a backup. Once constructed, the Writer Metadata Document is typically a read-only object.

In the course of processing the backup, a writer specifies the files it is responsible for through the Writer Metadata Document. The requester may interpret this metadata, choose what to back up, and store these decisions in the Backup Components Document. This Backup Components Document may be available for writer inspection and modification during both the backup and restore operations.

A writer reports the dataset to be backed up (e.g., databases) as shadow copy components. The writer relies on the backup application to use the shadow copy service APIs to select the dataset (e.g., databases) that the backup application wishes to backup. The application logic makes a selection of the writer components associated with the databases in the job description to select the appropriate shadow copy components for backup.

In a specific embodiment, the orchestration engine receives from the shadow copy common requestor writer metadata documents, writer components (objects), a snapshot set ID (GUID), and snapshot volume names.

In particular, in a step 435, the orchestration engine calls the application manager, which parses the one or more metadata documents to generate a job request identifying the items for the save transports to be backed up from the shadow copy and other backup details such as the type of backup to perform, how the items should be recorded, or whether to perform a full or incremental backup. For example, the job request may specify based on a policy setting whether the backup should be a traditional save or a block-based backup. In a specific embodiment, there is a policy setting that specifies applications are to be backed up using a block-based backup. The policy setting may be configurable such as by an administrator.

The orchestration engine may perform further tasks related to the backup operation including assigning drive letters or volume mount points to a shadow copy so that the volume can be accessed, and assigning aliases of original filenames and file paths on the shadow copy volume. Aliasing facilitates indexing of the files when backing up during the save transports stage. Aliasing allows the file to be recorded with its original file path and as having been backed up from the shadow copy volume.

In a step 440, the orchestration engine passes the job description of the backup to the save transports. The save transports receives the job description and proceeds to copy the specified data from the shadow copy to the backup storage server according to the job description. In a specific embodiment, a saveset is generated. The saveset includes the data from the shadow copy to be backed up. Multiple savesets may be generated. Each saveset may be associated with a shadow copy session identifier.

Figure 5:
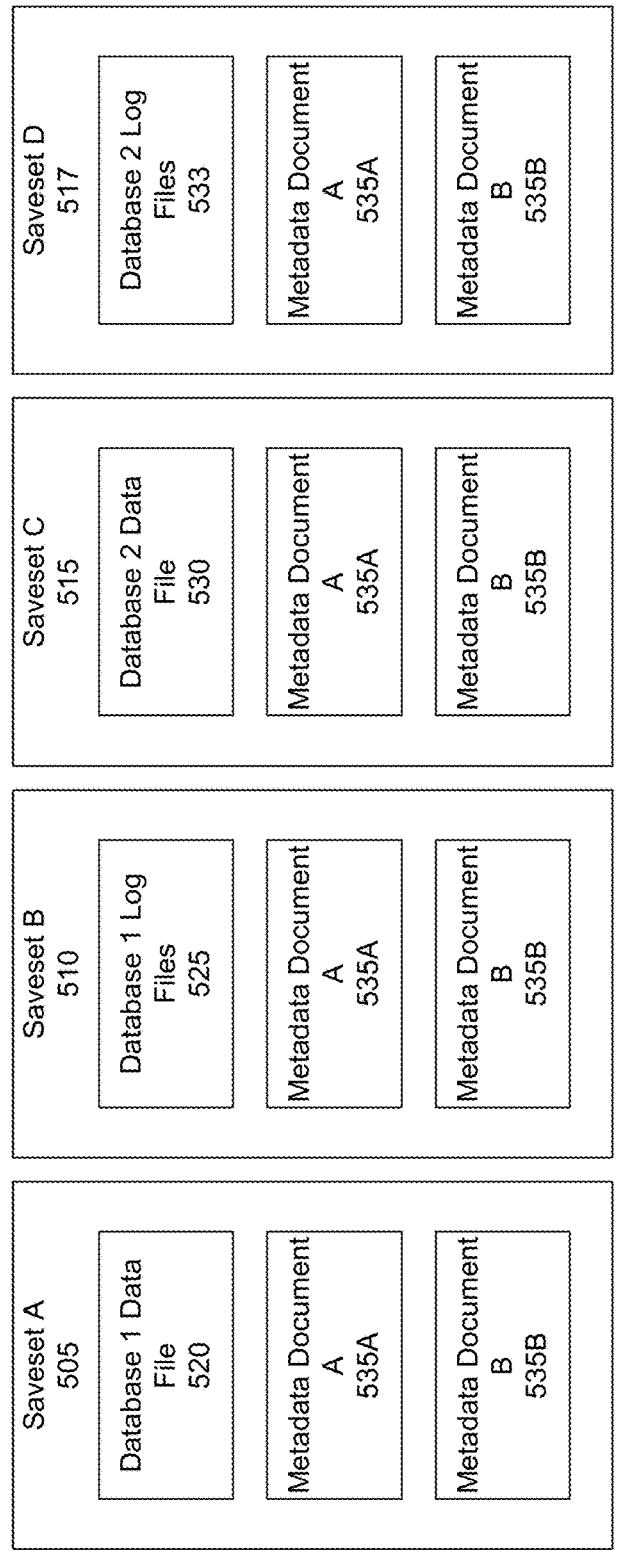
FIG. 5 shows a block diagram of information that may be saved in different savesets.

For example, FIG. 5 shows an example of savesets for multiple (e.g., two) databases. In this example, there is a saveset A 505, a saveset B 510, a saveset C 515, and a saveset D 517 having been created for a backup operation involving first and second databases.

Saveset A includes a first database 1 data file 520. Saveset B includes first database 1 log files 525. Saveset C includes a second database 2 data file 530. Saveset D includes second database 2 log files 533. Copies of first and second metadata documents A and B (535A, 535B) may be stored with savesets A, B, C, and D. In a specific embodiment, a metadata document may be stored within a saveset as a separate or individual document in the saveset rather than being stored as a single large XML document having the metadata from two or more metadata documents. The redundancy helps to increase the number of recovery options such as in cases where the media having one of the backed up databases is damaged. In other words, storing the metadata separately provides more redundancy as compared to storing the metadata in a single large file. Each backup object is self-contained and does not depend on the other to be restorable.

That is, rather than having a separate saveset that stores the combined metadata document, the individual metadata documents are stored on all savesets. A problem with storing the metadata document in the separate saveset is that should the saveset be lost (e.g., saveset media damaged), the data in the other associated savesets (e.g., database data files) would be unrecoverable through VSS methods. Storing the metadata documents within each saveset, however, provides redundancy. The redundancy of storage of the metadata documents means that as long as the savesets for a database are available, even if others are lost, the necessary metadata documents are available to recover the data in that saveset.

Once the save transports component completes the backup of data from the shadow copy including backing up the metadata documents, the save transports informs the orchestration engine of the completion. The orchestration engine, in turn, informs the shadow copy service via the shadow copy common requestor of the completion. The shadow copy service, in turn, informs the applications (e.g., Exchange®) of the completion. The application, upon receiving confirmation that the backup is completed may then truncate its log file. Upon completion of the backup operation, the orchestration engine returns a confirmation status to the backup server.

Figure 6:
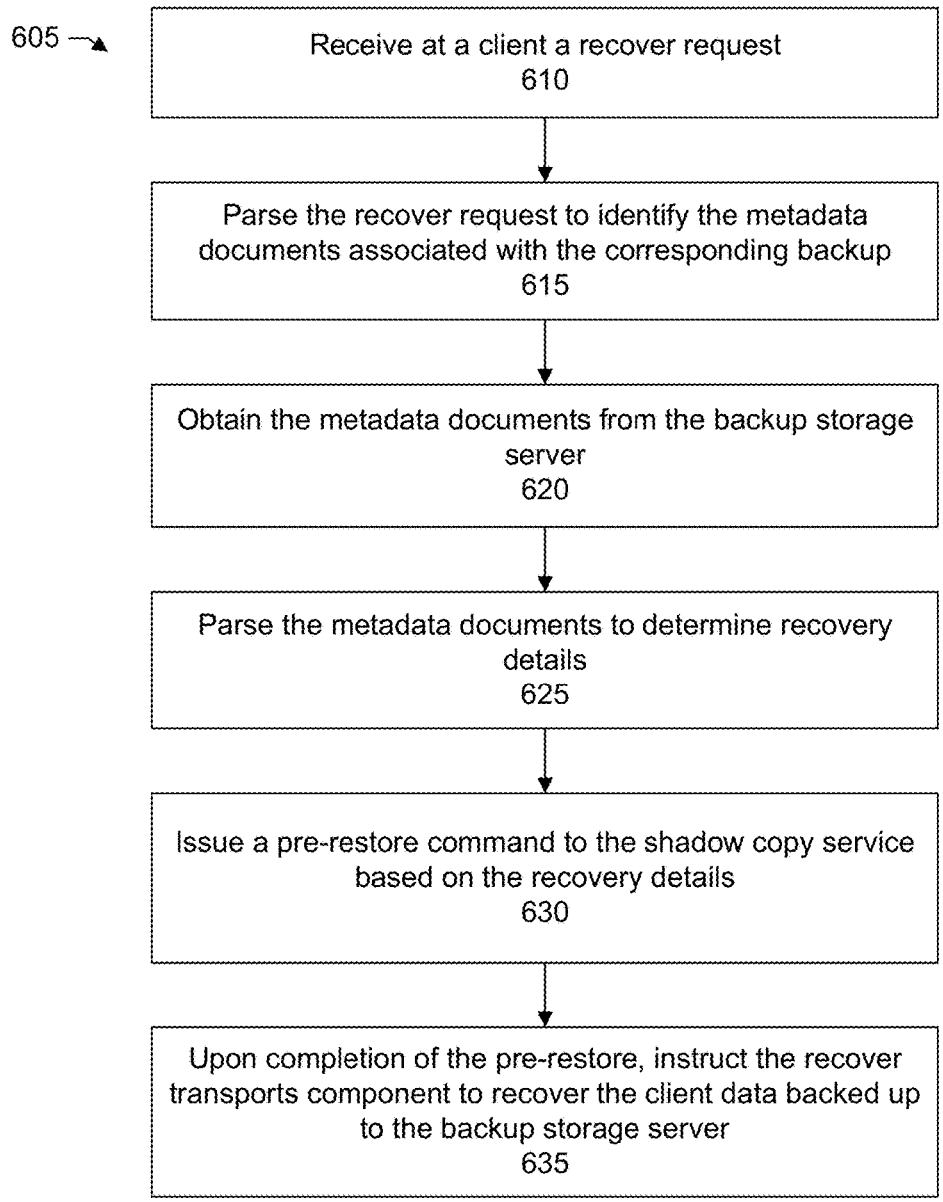
FIG. 6 shows a flow diagram for a recover operation.

FIG. 6 shows an overall flow 605 of a recover operation. In a specific embodiment, there can be a graphical user interface (GUI) on top of the orchestration engine that executes as a separate process. The GUI communicates with the backup catalog to display to an administrator backed up items from the backup catalog. The administrator interacts with the GUI to select an item to recover and any restore options. In a step 610, the orchestration engine at the client receives a request to recover a backup.

In a step 615, the orchestration engine parses the recover request to extract information in the request such as an identification of the metadata documents associated with the corresponding backup, an identification of the selected backed up item to recover (e.g., an Exchange database), the time of the backup, and parameters that may be specific to the selected item.

In a step 620, the orchestration engine retrieves from the backup storage server the one or more metadata documents associated with the corresponding backup. In a specific embodiment, the orchestration engine retrieves two metadata documents including the Backup Components Document and the Writer Metadata Document that were saved as part of the backup.

In a step 625, the orchestration engine parses the metadata documents to determine the recovery details. For example, the Writer Metadata Document may specify the backed up database GUID, database files, database log files, and path. The Backup Components Document may specify the shadow copy GUID and which writer components were part of the shadow copy. The orchestration engine communicates with the application logic to validate the recovery details.

For example, in the case of a database to be recovered, the orchestration engine may communicate with the application logic to verify that the database is in a proper state for a restore. Some databases require certain settings or properties to checked (or unchecked) before they can be restored. The Microsoft Exchange® database, for example, requires the property "Allow Database to be Overridden" to be checked before the database can be restored.

Upon the recovery details being validated, the orchestration engine communicates with the shadow copy common requestor to identify and select the components that should be restored. This may include, for example, selecting the Exchange component database and corresponding writer and writer components.

In a step 630, the orchestration engine issues a pre-restore request through the shadow copy common requestor to the shadow copy service. The shadow copy service, in turn, notifies the writers that have writer components selected for recovery of the upcoming recover operation. This allows the writers to prepare for the coming restore operation.

In a step 635, upon completion of the pre-restore, the orchestration engine instructs the recover transports component to restore the backed up files. Consider, as an example, the restoration of an Exchange® database because there has been a disk crash on the Exchange® server that requires a disk replacement. The backup catalog will have stored the file manifest for the database that specifies the database location and location of the backed up log files. The file manifest can be used to identify for the recover transports components the files that need to be restored. The catalog may further include a mapping of filenames to savesets since the files to be restored may be in different savesets. Savesets may be tracked using a unique key based on the save time. A block-based backup may include mounting the media in order to perform the recover operation. Files may be moved or copied from the backup storage server media to the original location on the new disk.

Once the files have been recovered (e.g., copied from the backup storage server to the client), the orchestration engine issues to the shadow copy service via the shadow copy common requestor a post restore command for the writers.

Figure 7:
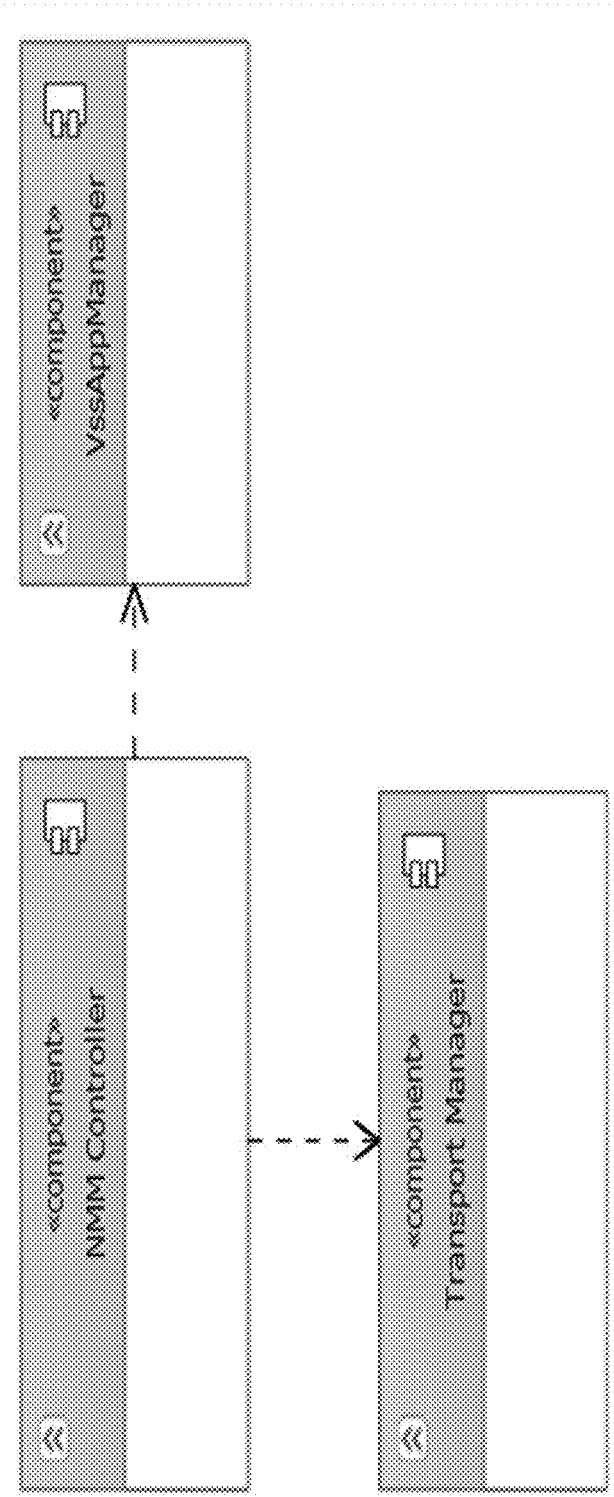
FIG. 7 shows a module interaction diagram in a specific embodiment.
Figure 8:
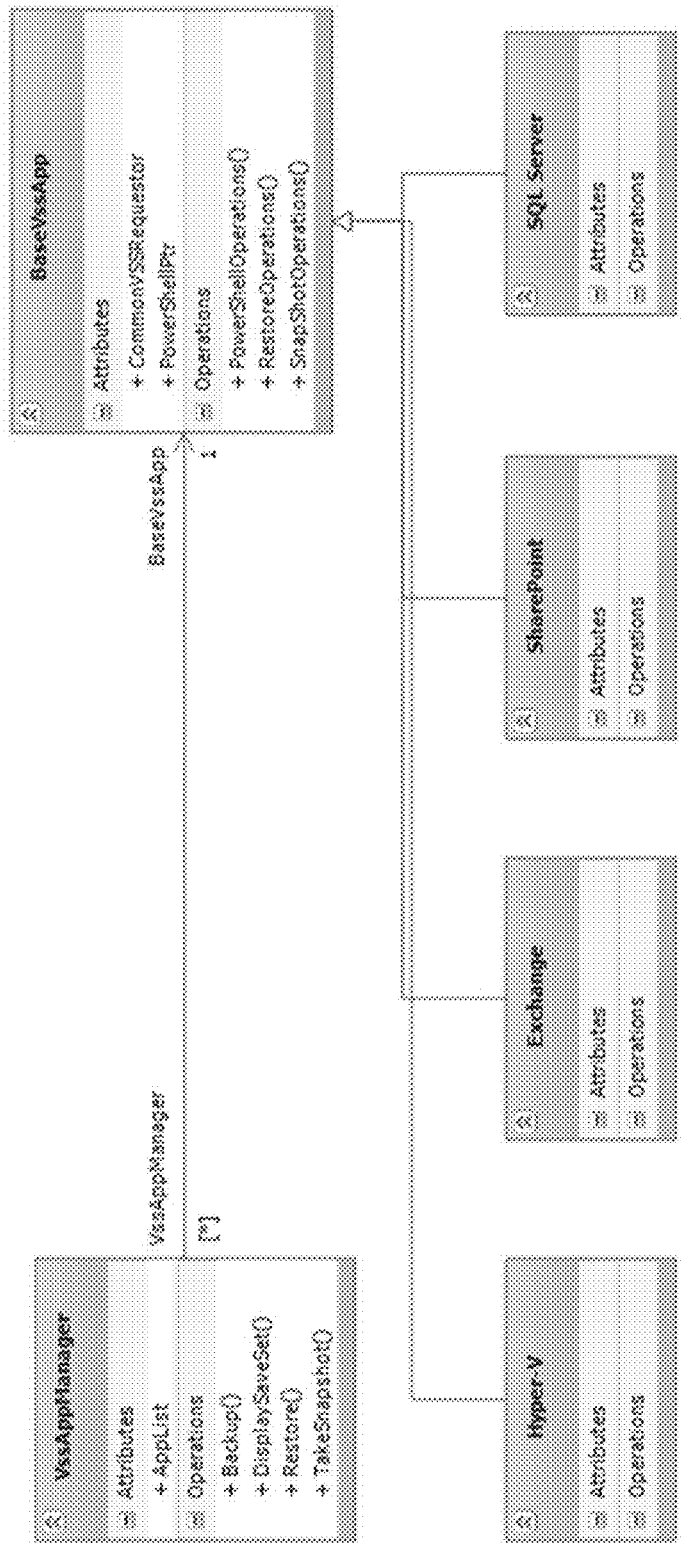
FIG. 8 shows a component and class diagram for an application manager in a specific embodiment.
Figure 9:
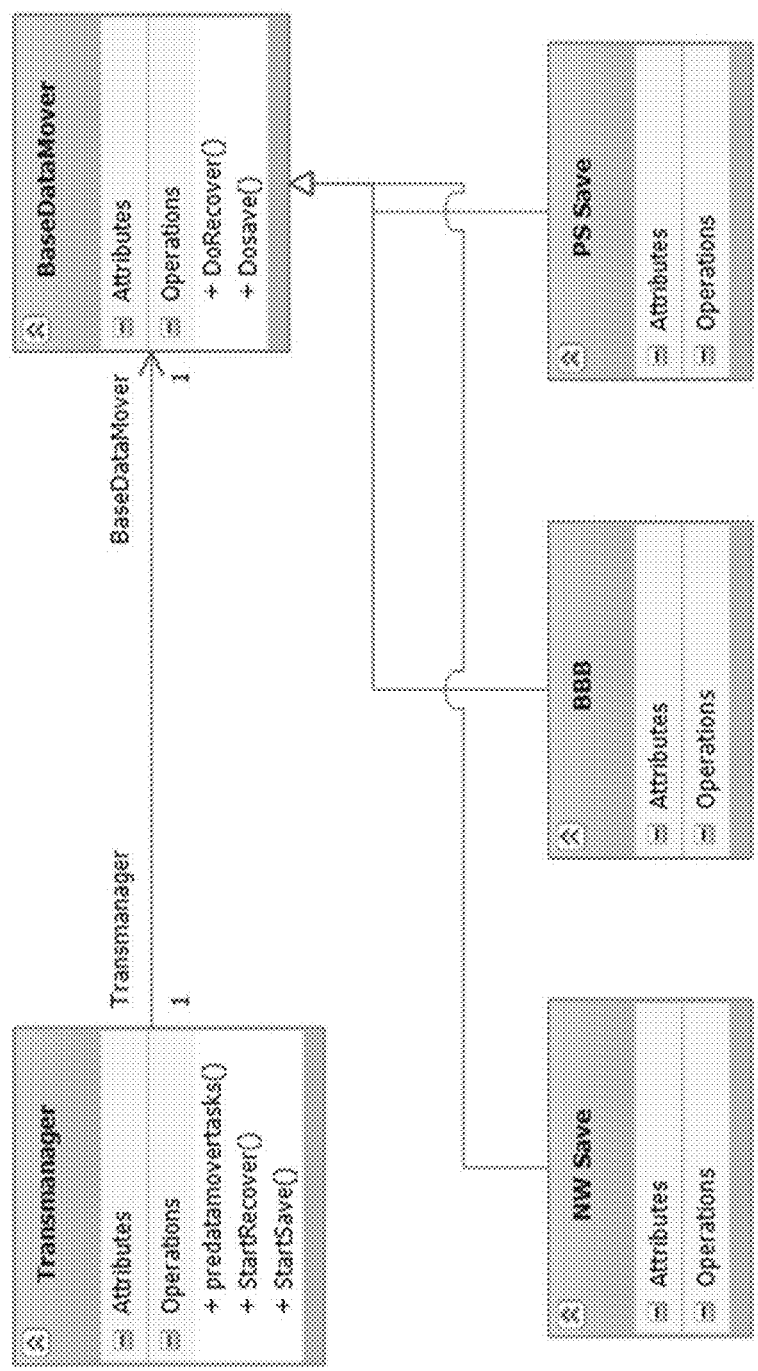
FIG. 9 shows a component and class diagram for a transport manager in a specific embodiment.
Figure 10:
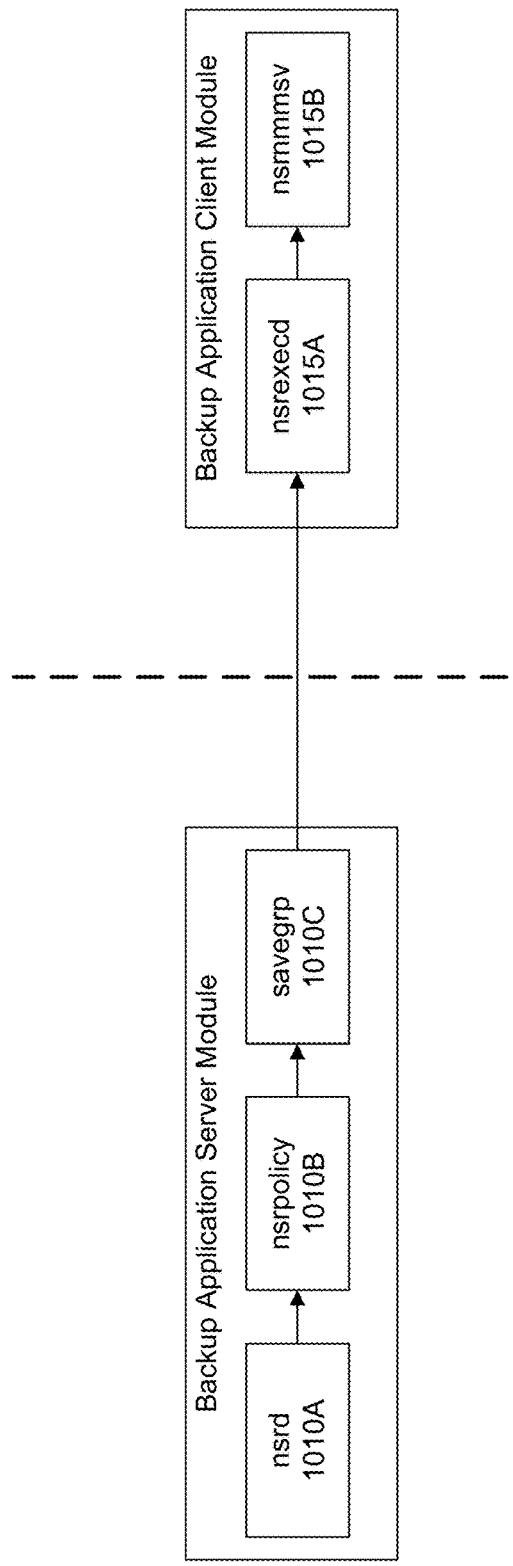
FIG. 10 shows a process model in a specific embodiment.

FIG. 7 shows a module interaction diagram for a specific embodiment of the system. FIGS. 8-9 show component and class diagrams for the application manager and transport manager, respectively, in this specific embodiment of the system. FIG. 10 shows a process model for this specific embodiment of the system. In this specific embodiment, the backup product is referred to as the Networker Module for Microsoft (NMM) as provided by EMC Corporation. In this specific embodiment, the orchestration engine is referred to as the NMM Controller. The application manger is referred to as the VssAppManager.

As shown in the example of FIG. 10, in this specific embodiment, the backup application server module includes first, second, and third server daemons 1010A-C, and first and second client daemons 1015A-B. First server daemon 1010A is referred to as nsrd (network save and recover). Second server daemon 1010B is referred to as nsrpolicy. Third server daemon 1010C is referred to as savegrp. First client daemon 1015A is referred to as nsrexecd. Second client daemon 1015B is referred to as nsrnmmsv. It should be appreciated that these processes may be referred to using any label or identifier.

The first server daemon (nsrd) is the master process that controls other processes on the backup server, clients, and storage nodes. Nsrd monitors active save or recover program sessions. The second server daemon (nsrpolicy) is responsible for reading and running data protection policies. For example, there can be policies specifying backup retention periods, encryption, type of backup to perform, backup schedules, and so forth. The third server daemon (savegrp) is responsible for contacting the first client daemon (nsrexecd) on the client to start an operation (e.g., backup operation). Nsrexecd authenticates and processes the backup server remote execution requests and executes programs on the client to save the client data to the backup storage node. Nsrnmmsv is responsible for managing operations for backing up data on the client to the backup storage server.

In a specific embodiment, a method includes providing, at a client computer, a backup application client module comprising an orchestration engine, an application manager, a common requestor, and a save transports component, the application manager being coupled between the orchestration engine and the common requestor, receiving, at the orchestration engine, a request for a backup of the client, where the client is running a Microsoft Windows® Volume Shadow Copy Service (VSS)™, parsing, by the orchestration engine, the backup request to generate a request for a shadow copy, issuing, from the orchestration engine to the application manager to the common requestor, the request for the shadow copy, receiving, at the orchestration engine through the common requestor, an indication that the shadow copy has been created, the indication comprising one or more documents having metadata associated with the shadow copy, the shadow copy and the one or more metadata documents having been created by the VSS, parsing, by the application manager, the one or more documents to generate a job request for the save transports component, the job request comprising a list of items to be backed up from the shadow copy, and a specification of a type of backup to be performed, and backing up, by the save transports component, items specified in the list from the shadow copy according to the specified backup type, and the one or more documents.

The application manager may include functions that are application-specific and the orchestration engine may include functions that are not application-specific. The save transports component may include a library of functions stored on the client computer.

In a specific embodiment, the method further includes generating a single log file by the backup application client module for the backup. In another specific embodiment, the method further includes calling, by the common requestor, an event-logger to log a first event associated with the backup, and calling, by the save transports components, the same event-logger to log a second event associated with the backup. The method may further include each of the orchestration engine, application manager, common requester, and save transports component calling the same event-logger to log events associated with the backup.

In a specific embodiment, the shadow copy service includes a writer associated with an application on the client to be backed up, and wherein the writer quiesces the application to prepare the application for shadow copy creation.

In another specific embodiment, there is a system for backup and recovery of applications compatible with a Microsoft Windows® Volume Shadow Copy Service (VSS)™, the system comprising: a processor-based system executed on a computer system and configured to: execute a backup application client module at a client computer, the backup application client module comprising an orchestration engine, an application manager, a common requestor, and a save transports component, the application manager being coupled between the orchestration engine and the common requestor, receive, at the orchestration engine, a request for a backup of the client, where the client is running the VSS, parse, by the orchestration engine, the backup request to generate a request for a shadow copy, issue, from the orchestration engine to the application manager to the common requestor, the request for the shadow copy, receive, at the orchestration engine through the common requestor, an indication that the shadow copy has been created, the indication comprising one or more documents having metadata associated with the shadow copy, the shadow copy and the one or more metadata documents having been created by the VSS, parse, by the application manager, the one or more documents to generate a job request for the save transports component, the job request comprising a list of items to be backed up from the shadow copy, and a specification of a type of backup to be performed, and backup, by the save transports component, items specified in the list from the shadow copy according to the specified backup type, and the one or more documents.

In another specific embodiment, there is a computer program product, comprising a non-transitory computer-readable medium having a computer-readable program code embodied therein, the computer-readable program code adapted to be executed by one or more processors to implement a method comprising: providing, at a client computer, a backup application client module comprising an orchestration engine, an application manager, a common requestor, and a save transports component, the application manager being coupled between the orchestration engine and the common requestor, receiving, at the orchestration engine, a request for a backup of the client, where the client is running a Microsoft Windows® Volume Shadow Copy Service (VSS)™, parsing, by the orchestration engine, the backup request to generate a request for a shadow copy, issuing, from the orchestration engine to the application manager to the common requestor, the request for the shadow copy, receiving, at the orchestration engine through the common requestor, an indication that the shadow copy has been created, the indication comprising one or more documents having metadata associated with the shadow copy, the shadow copy and the one or more metadata documents having been created by the VSS, parsing, by the application manager, the one or more documents to generate a job request for the save transports component, the job request comprising a list of items to be backed up from the shadow copy, and a specification of a type of backup to be performed, and backing up, by the save transports component, items specified in the list from the shadow copy according to the specified backup type, and the one or more documents.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
providing, at a client computer, a backup application client module comprising an orchestration engine, an application manager, a common requestor, and a save transports component, the application manager being coupled between the orchestration engine and the common requestor;
receiving, at the orchestration engine, a request for a backup of an application on the client, wherein the client is running a copy service that is separate from the backup application client module;
parsing, by the orchestration engine, the backup request to generate a request for a snapshot;
issuing, from the orchestration engine to the application manager to the common requestor, the request for the snapshot;
receiving, at the orchestration engine through the common requestor, an indication that the snapshot has been created, the indication comprising first and second metadata documents having metadata associated with the snapshot, wherein the first metadata document identifies a writer that quiesced the application for the snapshot, files that the writer is responsible for, and is read-only to the backup application client module, and wherein the second metadata document is modifiable by the backup application client module, the snapshot and the first and second metadata documents having been created by the copy service;
parsing, by the application manager, the first and second metadata documents to generate a job request for the save transports component, the job request comprising a list of items to be backed up from the snapshot, and a specification of a type of backup to be performed; and
backing up, by the save transports component, items specified in the list from the snapshot according to the specified backup type, and the first and second metadata documents.

2. The method of claim 1 wherein the application manager comprises functions that are application-specific and the orchestration engine comprises functions that are not application-specific.

3. The method of claim 1 wherein the save transports component comprises a library of functions stored on the client computer.

4. The method of claim 1 comprising:
generating a single log file by the backup application client module for the backup.

5. The method of claim 1 comprising:
calling, by the common requestor, an event-logger to log a first event associated with the backup; and
calling, by the save transports component, the same event-logger to log a second event associated with the backup.

6. The method of claim 1 comprising:
providing a first application manager to manage backing up a first application;
connecting the first application manager to the orchestration engine;
providing a second application manager, different from the first application manager, to manage backing up a second application different from the first application; and
connecting the second application manager to the same orchestration engine.

7. The method of claim 1 wherein the request comprises a request to backup a database and the backing up comprises:
creating a first saveset comprising a backup of the database, and a first copy of the first and second metadata documents; and
creating a second saveset comprising a backup of logs associated with the database, and a second copy of the first and second metadata documents.

8. A system for backup and recovery of applications compatible with a copy service, the system comprising:
a processor-based system executed on a computer system and configured to:
execute a backup application client module on a client computer, the backup application client module comprising an orchestration engine, an application manager, a common requestor, and a save transports component, the application manager being coupled between the orchestration engine and the common requestor;
receive, at the orchestration engine, a request for a backup of an application on the client, wherein the client is running the copy service, and the copy service is separate from the backup application client module;
parse, by the orchestration engine, the backup request to generate a request for a snapshot;
issue, from the orchestration engine to the application manager to the common requestor, the request for the snapshot;
receive, at the orchestration engine through the common requestor, an indication that the snapshot has been created, the indication comprising first and second metadata documents having metadata associated with the snapshot, wherein the first metadata document identifies a writer that quiesced the application for the snapshot, files that the writer is responsible for, and is read-only to the backup application client module, and wherein the second metadata document is modifiable by the backup application client module, the snapshot and the first and second metadata documents having been created by the copy service;
parse, by the application manager, the first and second metadata documents to generate a job request for the save transports component, the job request comprising a list of items to be backed up from the snapshot, and a specification of a type of backup to be performed; and
backup, by the save transports component, items specified in the list from the snapshot according to the specified backup type, and the first and second metadata documents.

9. The system of claim 8 wherein the application manager comprises functions that are application-specific and the orchestration engine comprises functions that are not application-specific.

10. The system of claim 8 wherein the save transports component comprises a library of functions stored on the client computer.

11. The system of claim 8 wherein the processor-based system is configured to:
generate a single log file by the backup application client module for the backup.

12. The system of claim 8 wherein the processor-based system is configured to:
call, by the common requestor, an event-logger to log a first event associated with the backup; and
call, by the save transports component, the same event-logger to log a second event associated with the backup.

13. A computer program product, comprising a non-transitory computer-readable medium having a computer-readable program code embodied therein, the computer-readable program code adapted to be executed by one or more processors to implement a method comprising:
providing, at a client computer, a backup application client module comprising an orchestration engine, an application manager, a common requestor, and a save transports component, the application manager being coupled between the orchestration engine and the common requestor;
receiving, at the orchestration engine, a request for a backup of an application on the client, wherein the client is running a copy service that is separate from the backup application client module;
parsing, by the orchestration engine, the backup request to generate a request for a snapshot;
issuing, from the orchestration engine to the application manager to the common requestor, the request for the snapshot;
receiving, at the orchestration engine through the common requestor, an indication that the snapshot has been created, the indication comprising first and second metadata documents having metadata associated with the snapshot, wherein the first metadata document identifies a writer that quiesced the application for the snapshot, files that the writer is responsible for, and is read-only to the backup application client module, and wherein the second metadata document is modifiable by the backup application client module, the snapshot and the first and second metadata documents having been created by the copy service;
assigning a drive letter to the snapshot;
parsing, by the application manager, the one or more documents to generate a job request for the save transports component, the job request comprising a list of items to be backed up from the snapshot, and a specification of a type of backup to be performed;
accessing the snapshot via the assigned drive letter; and
backing up, by the save transports component, items specified in the list from the snapshot according to the specified backup type, and the one or more documents.

14. The computer program product of claim 13 wherein the application manager comprises functions that are application-specific and the orchestration engine comprises functions that are not application-specific.

15. The computer program product of claim 13 wherein the save transports component comprises a library of functions stored on the client computer.

16. The computer program product of claim 13 wherein the method comprises:
generating a single log file by the backup application client module for the backup.

17. The computer program product of claim 13 wherein the method comprises:
- calling, by the common requestor, an event-logger to log a first event associated with the backup; and
- calling, by the save transports component, the same event-logger to log a second event associated with the backup.

* * * * *